July 8, 1958 P. D. GRIMMER 2,841,888
SLIDE RULE DEMONSTRATOR FOR OVERHEAD PROJECTOR
Filed March 24, 1955 3 Sheets-Sheet 1
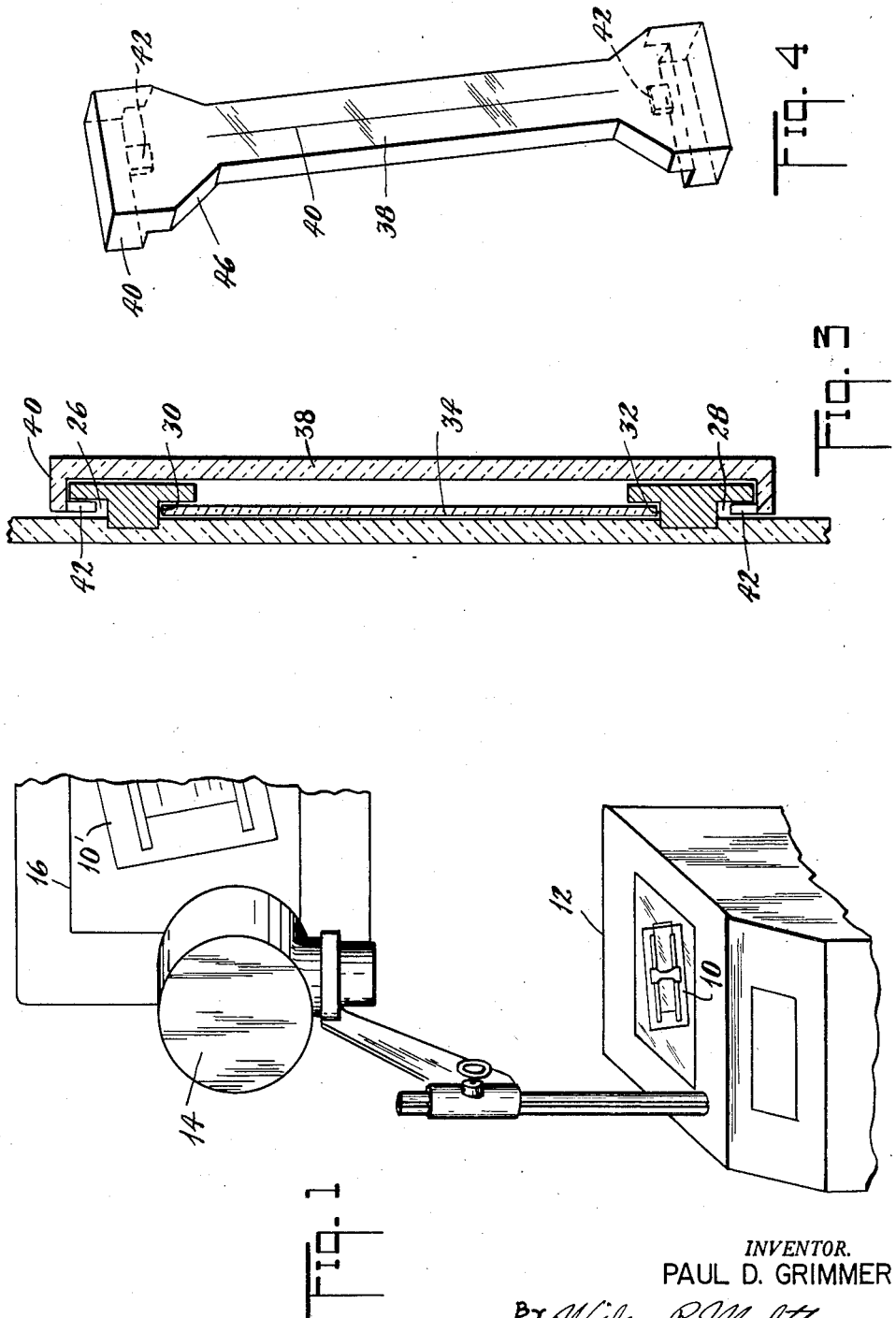
INVENTOR.
PAUL D. GRIMMER July 8, 1958 P. D. GRIMMER 2,841,888
SLIDE RULE DEMONSTRATOR FOR OVERHEAD PROJECTOR
Filed March 24, 1955 3 Sheets-Sheet 2
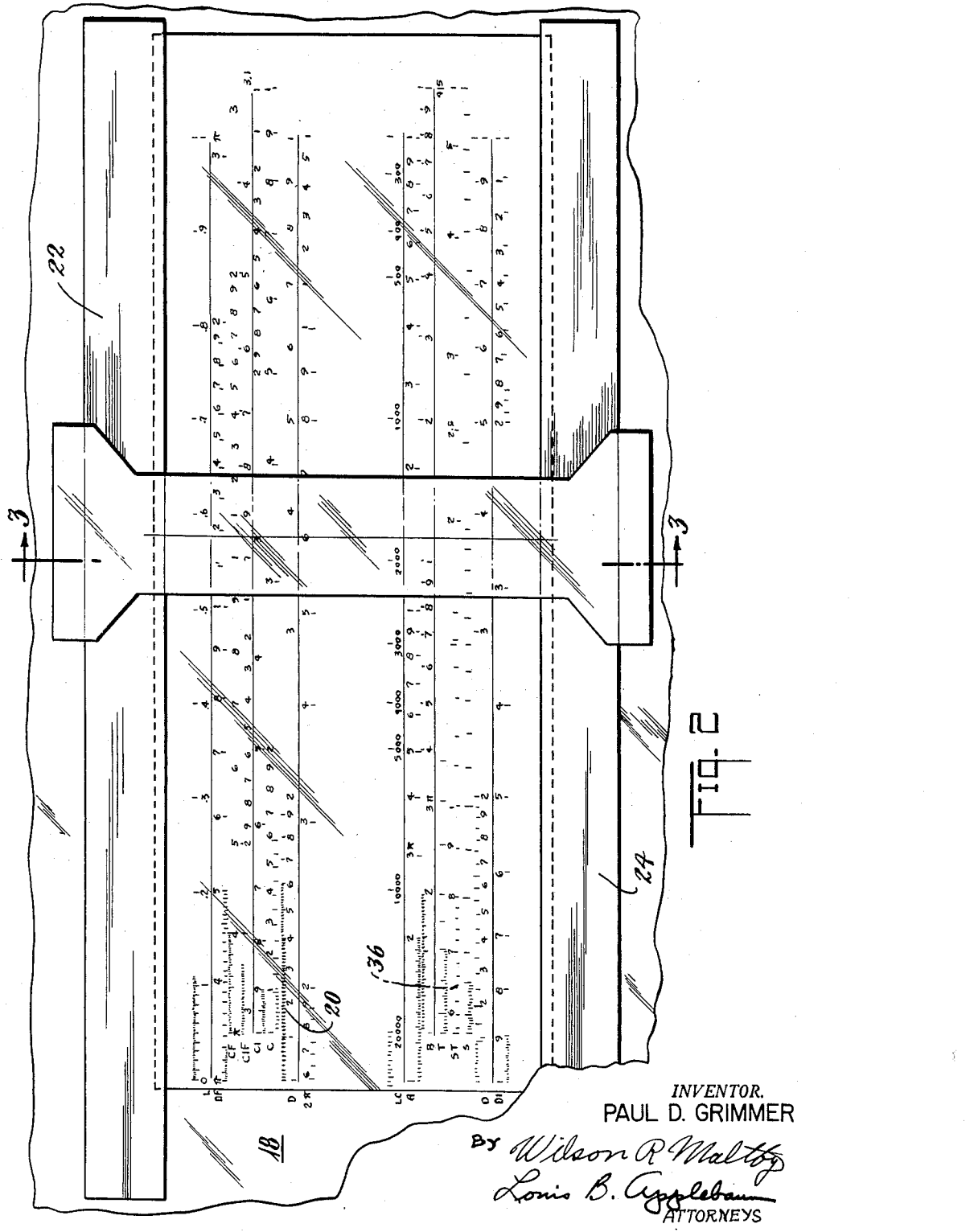
INVENTOR.
PAUL D. GRIMMER
ATTORNEYS July 8, 1958 P. D. GRIMMER 2,841,888
SLIDE RULE DEMONSTRATOR FOR OVERHEAD PROJECTOR
Filed March 24, 1955 3 Sheets-Sheet 3

INVENTOR.
PAUL D. GRIMMER
BY
Lawrence S. Epstein
ATTORNEYS

2,841,888

SLIDE RULE DEMONSTRATOR FOR OVERHEAD PROJECTOR

Paul D. Grimmer, Jackson Heights, N. Y.

Application March 24, 1955, Serial No. 496,630

1 Claim. (Cl. 35—39)

(Granted under Title 35, U. S. Code (1952), sec. 266)

The invention described herein may be manufactured and used by or for the Government of the United States of America for governmental purposes without the payment of any royalties thereon or therefor.

This invention relates to a training device for instructing large groups or classrooms of pupils. This is accomplished by combination with an overhead projection system for transferring an enlarged transparency to a screen.

In training students in the use of the slide-rule, it is desirable to teach large groups at the same time. Methods used heretofore were cumbersome and expensive. One conventional method required the construction of a large scale model of the particular slide rule to be demonstrated. Due to the physical size of the model, operation was difficult and the expense of construction was materially high. The instant invention overcomes the inadequacies of the prior devices by the provision of a transparent photograph of a slide rule which is mounted for enlarged projection on a screen.

The primary object of the invention is to teach a group of students the operation of the slide rule.

Another object of the invention is to provide a transparent slide rule that can be projected on a screen for instructing a group of students.

Still another object of the invention is to provide a transparent slide rule of conventional size to be used in conjunction with an overhead projector, whereby the transparency will be projected in magnified form on a large screen. This permits a large group of people to be accommodated while avoiding the necessity for enlarging the slide rule.

Other objects and many of the attendant advantages of this invention will be readily appreciated as the same becomes better understood by reference to the following detailed description when considered in connection with the accompanying drawings wherein:

Fig. 1 is an elevation of an overhead projector and screen retaining the slide rule of the invention in position for projection on the screen;

Fig. 2 is a front elevation of the slide rule of the invention;

Fig. 3 is a section taken on line 3—3 of Fig. 2;

Fig. 4 is a perspective view of the cursor used and

Figure 5:
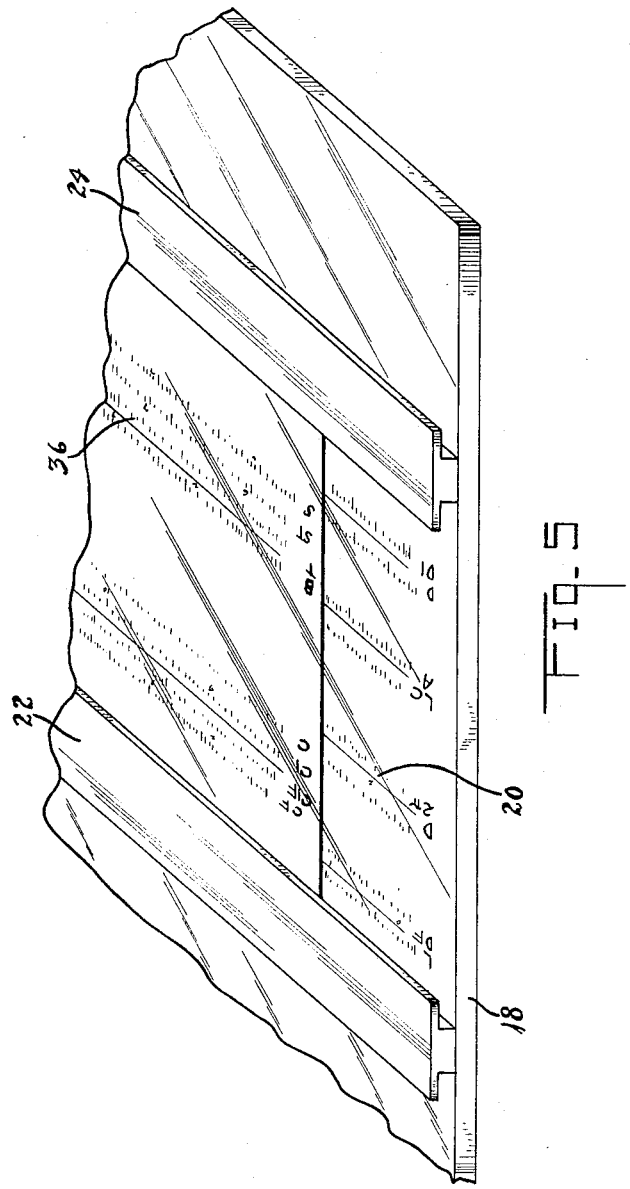
Fig. 5 is a perspective view showing one end of the slide rule demonstrator.

The slide rule demonstrator 10 is shown in position for projection on the support 12 of an overhead projector 14. The image of transparency 10, illuminated from below and magnified several times its normal size is shown at 10' on screen 16. Projector 14 is conventional in design and need not be further described.

Slide rule 10 includes a base made preferably of plastic although any suitable transparent material may be used. Intermediate longitudinal section 18 is made of clear plastic and contains the logarithmic and antilogarithmic information 20 generally found on both sides of the slide rule. If desired, the base portion on each side of section 18 may be colored to provide contrast to the slide rule logarithms, thereby enabling the student to more readily see the projected information.

A pair of spaced, parallel tracks 22 and 24 are secured to base 10 and are provided with grooved edges 26 and 28, and rabbeted edges 30 and 32.

A transparent plastic medial slide strip 34, showing both face and reverse sides 36 of the logarithmic scales, is slidably held between rabbeted edges 30 and 32 for slidable movement relative to base portion 18. It is to be noted that strip 34 is made of relatively thin plastic material and thus appears to lie in the same plane as base 10. This closely approximates the conventional position of the slides used in operational slide rules.

Cursor or rider 38 is provided with transverse rails 40 adapted to slide on the outer edges of tracks 22 and 24. Rider 38 is also of clear plastic. Tabs 42 depend from the outer surface of rails 40 and extend into grooves 26 and 28. Tabs 42 may consist of the narrow construction illustrated, or may extend the entire length of rails 40. An engraved hair line marking means 44 is engraved on rider 38. Cursor 38 comprises a narrow, elongated intermediate section, diverging at each end at 46, to provide a larger riding surface on tracks 22 and 24. The intermediate section is readily grasped by the person using the slide rule, while binding is prevented by enlarged end sections 46. Obviously, other forms of cursors could be substituted. For example, a cursor with opposed parallel sides could be employed.

When the device is in use, slide rule 10 is positioned on projector table 12 and is illuminated from below. Projector 14 transmits the image of the transparency on screen 16 in greatly magnified form. The entire class is thus taught at the same time. Due to the transparent construction of the portion of the device containing the logarithmic scales, a clear image is projected on the screen.

Obviously many modifications and variations of the present invention are possible in the light of the above teachings. It is therefore to be understood that within the scope of the appended claims the invention may be practiced otherwise than as specifically described.

What I claim is:

A slide rule demonstrator for an overhead projector comprising a fixed transparent planar base, slide rule indicia on the upper face of said base, track means extending from said base, a transparent relatively thin planar plastic strip overlying said base and slidably held in said track means for longitudinal movement on said base, slide rule indicia on the upper face of said plastic strip and a transparent cursor movably coupled to said track means and overlying said transparent strip and base.

References Cited in the file of this patent

UNITED STATES PATENTS

| | | |
|---|---|---|
| 1,398,914 | Pierce | Nov. 29, 1921 |
| 1,579,880 | Meissner et al. | Apr. 6, 1926 |
| 1,875,927 | Keuffel | Sept. 6, 1932 |

FOREIGN PATENTS

| | | |
|---|---|---|
| 627,514 | Great Britain | Aug. 10, 1949 |
| 719,080 | Great Britain | Nov. 24, 1954 |